June 29, 1965  R. L. BERGESON  3,192,455
LEVEL GAUGE CAPACITOR WITH ELECTRODES OF DIFFERENT MATERIALS
Filed Dec. 6, 1960
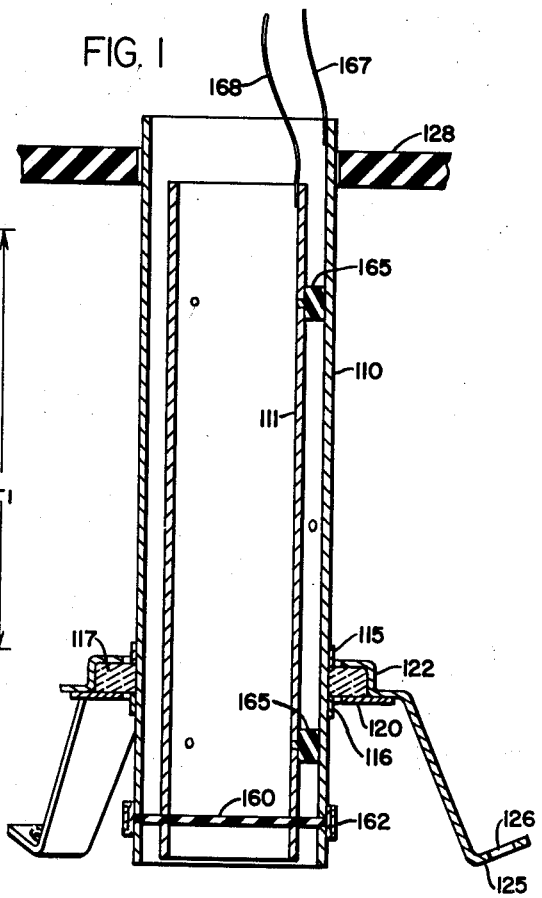
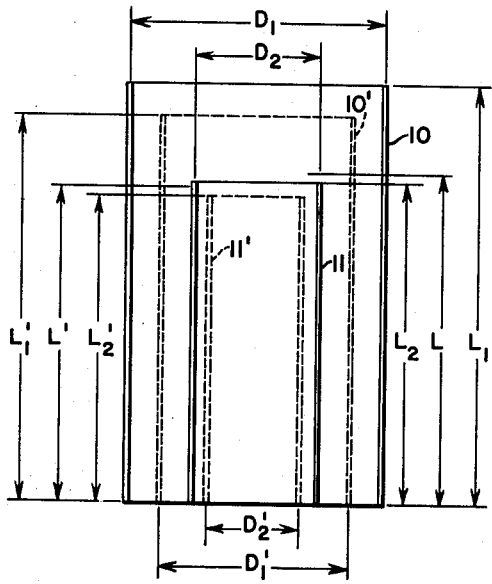
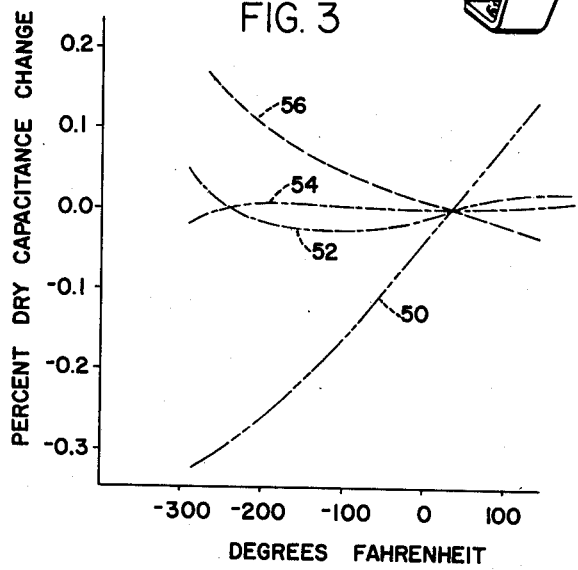
INVENTOR.
RAYMOND L. BERGESON
BY Charles J. Ungemach
ATTORNEY

United States Patent Office 3,192,455
Patented June 29, 1965

3,192,455
LEVEL GAUGE CAPACITOR WITH ELECTRODES OF DIFFERENT MATERIALS
Raymond L. Bergeson, St. Paul, Minn., assignor to Honeywell Inc., a corporation of Delaware
Filed Dec. 6, 1960, Ser. No. 74,109
4 Claims. (Cl. 317—247)

This invention relates to an improved capacitor which is capable of maintaining a relatively constant value of capacitance over a wide temperature range and more particularly relates to a fluid level sensing capacitor operable to sense low temperature liquids or cryogenic liquids without appreciably changing its basic capacitance value due to dimensional distortion.

A typical fluid level gaging capacitor comprises a pair of metallic electrodes arranged in concentric relationship and having air as a dielectric. The gaging capacitor is adapted to be mounted in a container of fluid so that the fluid replaces the air as a dielectric to an extent depending on its level and since the fluid normally has a greater dielectric constant than air the gaging capacitor varies in capacitance in accordance with the level of fluid in the container. A suitable circuit connected to measure the capacitance of the gaging capacitor may then be used to provide a useful output indicative of fluid quantity.

In recent years there has been increasing activity in the field of cryogenic fluid utilization as for example liquid oxygen which is utilized in rocket fuels and for pilot breathing. It has become increasingly important to accurately measure quantities of such low temperature fluids with capacitance type fluid gaging apparatus but it has been found that the sensing capacitor if constructed according to the teachings of the prior art, will undergo dimensional distortion from the temperature at which it is calibrated to the low temperature at which it is used. This distortion causes relatively small but important and undesirable errors in the system. Furthermore, when in use and as the cold fluid drains, the upper portion of the capacitor exposed to air or gas may be at a much higher temperature than the lower portion in the liquid thus creating a temperature gradient accompanied by dimensional distortion and capacitance errors. The prior art sensing capacitors have generally been constructed with at least two concentrically arranged electrodes having substantially the same length and being constructed of the same material. Such capacitors operate satisfactorily during normal temperature variations but when subjected to extreme temperature variations the length of the electrodes and their diameters will change. However, the ratio of the diameters will not change. The equation for the capacitance of concentric cylinders is:

$$C = K \frac{0.2416 L}{\log_{10} \frac{D_1}{D_2}}$$

where C is the capacitance in micro micro farads of the coaxial cylinders, L their length in centimeters, $D_1$ the diameter of the outer cylinder in centimeters, $D_2$ the diameter of the inner cylinder in centimeters, and K the dielectric constant of the material between the electrodes. From this equation it is seen that with the ratio of the diameters constant the capacitance of the sensor will vary as the length changes due to temperature.

The present invention overcomes this problem by causing the ratio of the diameters to change in such a manner as to compensate for the change in length due to temperature. The ratio of the diameters is caused to change by constructing the inner and outer electrodes of the sensing capacitor from two metals having different coefficients of thermal expansion. The metals are so chosen that their coefficients of thermal expansion are different by an amount necessary to cause the $\log_{10} D_1/D_2$ to vary with temperature in the same manner as L.

A more complete understanding of the invention will be gained upon examination of the accompanying specification, claims and drawings in which:

FIGURE 1 is a cross sectional view of a sensing capacitor constructed according to the present invention,
FIGURE 2 is a simplified schematic representation of the capacitor of FIGURE 1, and
FIGURE 3 is a graph showing the variation of percent dry capacitance change with temperature for various combinations of materials.

Referring to FIGURE 2, an outer cylindrical electrode or plate 10 and an inner cylindrical electrode or plate 11 are shown in concentric relationship. Electrode 10 is shown having a length $L_1$ and electrode 11 is shown having a length $L_2$. It is seen that $L_1$ is somewhat greater than $L_2$ for purposes to be explained hereinafter. Outer electrode 10 is shown having a diameter $D_1$ and inner electrode 11 is shown having a diameter $D_2$. The length $L_1$, $L_2$ and diameters $D_1$ and $D_2$ are representative of the dimensions of these electrodes when the capacitor is at a relatively high temperature. Also shown in FIGURE 2 are dashed line electrodes representative of the same electrodes at a relatively low temperature. Dashed line electrode 10' is shown having a length $L_1'$ and a diameter $D_1'$. Inner electrode 11' is shown having a length $L_2'$ and a diameter $D_2'$. Lenthgs $L_1'$ and $L_2'$ and diameters $D_1'$ and $D_2'$ are shown considerably smaller than the corresponding lengths $L_1$ and $L_2$ and diameters $D_1$ and $D_2$ indicative of the contraction which the capacitor undergoes from relatively high temperatures to relatively low temperatures. The amount of contraction has been shown greatly exaggerated for purposes of clarity.

In FIGURE 2 electrode 10 has been shown greater in length than electrode 11 because in this embodiment the coefficient of thermal expansion of the material used for electrode 10 is greater than the coefficient of thermal expansion for electrode 11. Thus, electrode 10 will contract a larger amount than electrode 11 for the same temperature change. If these electrodes had been made of the same length, the outer electrode would be shorter than the inner electrode at low temperature. Since the outer electrode is longer than the inner electrode, the actual effective length of the capacitor will be slightly larger than the inner electrode on account of the fringe effects of the capacitor.

The effective length of the capacitor at a high temperature has been shown in FIGURE 2 as L. At low temperature the inner electrode 11' is still shorter than the outer electrode 10' and again the effective capacitance of the capacitor will be slightly larger than the inner electrode 11'. The effective capacitance of the capacitor at low temperature has been shown in FIGURE 2 as L'. Although the fringe effects change slightly from high temperature to low temperature, this change is negligible and the effective change in length of the capacitor is substantially equal to the change in length of the inner electrode. The inner electrode may thus be called a control electrode since the change in its length has the dominating influence on the change of length of the capacitor. Of course, the outer electrode could be made the control electrode by constructing a capacitor in which the inner electrode was longer than the outer electrode. This would be desirable where the coefficient of thermal expansion of the metal used to construct the inner electrode was greater than the coefficient of thermal expansion of the material used to construct the outer electrode. Whether the inner electrode or the outer electrode is chosen to be the control electrode, thus depends upon the materials used and the result which it is desired to achieve. This will be better seen with reference to FIGURE 3.

FIGURE 3 shows a plurality of curves each representing the percent change of dry capacitance of a sensing capacitor with temperature and each utilizing a different combination of materials for the electrodes. The capacitance at about 32° F. was taken as nominal dry capacitance and the percent variation in capacitance calculated by comparison of the capacitance at the various temperatures with the nominal value.

Curve 50 represents a capacitor constructed with both electrodes being aluminum as was heretofore common in the art. It is noticed that variation in temperature from about 150° F. to about −300° F. resulted in approximately .4% change in capacitance. Although this may seem to be a rather small error, where extreme accuracy is desired the error is still undesirable.

Curve 52 represents a capacitor made with titanium as the inner electrode and stainless steel as the outer electrode. In this case, titanium had a greater coefficient of thermal expansion than did stainless steel so the inner electrode was made longer than the outer electrode in a manner opposite to that shown in FIGURE 2. It is seen that the percent change in capacitance has been greatly reduced over the same temperature range and that using this combination of metals produces less than .05% change in capacitance.

Curve 54 represents a capacitor constructed with stainless steel as the inner electrode and aluminum as the outer electrode. Since the coefficient of thermal expansion for aluminum is greater than that for steel the inner electrode was made smaller than the outer electrode like the capacitor shown in FIGURE 2. It is seen that this combination of metals produces even better control of capacitance change over the same temperature range.

Curve 56 represents a capacitance constructed with titanium as the inner electrode and aluminum as the outer electrode. Here again since titanium had a greater coefficient of thermal expansion than aluminum the outer electrode was made the control electrode opposite to that shown in FIGURE 1. It is seen that with these metals some improvement has been made over a capacitor constructed only of aluminum but that the characteristics of curve 56 are not as good as those of curves 52 and 54.

Other materials could be used which might provide even greater accuracy than the stainless steel aluminum capacitor of curve 54 but for purposes of explaining the invention it is sufficient to note that significantly greater accuracy has been provided utilizing a capacitor such as shown in FIGURE 2 wherein stainless steel comprises the inner electrode and aluminum comprises the outer electrode. In order to establish proper metals for use in the improved capacitor, the aforementioned equation for concentric cylinder capacitors $$C = K \frac{0.2416 L}{\log_{10} \frac{D_1}{D_2}}$$

can be used. Ideally, of course, $$\frac{L}{\log_{10} \frac{D_1}{D_2}}$$

should be constant, but with practical considerations such as cost of materials and the like it is usually sufficient to minimize the variation using fairly common materials like the aluminum and stainless steel of the preferred embodiment. The coefficient of thermal expansion of the materials can be obtained from a standard reference publication and the change in length as well as the change in ratio of the diameters can then be calculated for various temperatures. It has been noticed that the coefficient of expansion of various metals frequently change by small amounts from one temperature to another so that for accurate analysis the different coefficients of thermal expansion should be taken into account when establishing lengths and diameters.

The mounting structure necessary to place the fluid level sensing capacitor of the preferred embodiment in a tank of fluid to be measured may be any standard mounting arrangement except that the electrodes must be allowed to move axially with respect to each other and the slight change in diameters must be accommodated. FIGURE 1 shows a sensing capacitor wherein an outer electrode 110 and an inner electrode 111 are mounted in concentric relationship by apparatus suitable for a connection to a container. The outer electrode 110 has a first flange 115 and a second flange 116 fixed near its lower end. An insulative member 117 is placed between and positioned by the flanges 115 and 116. A washer shaped member 120 abuts the lower surface of insulative member 117 but is placed so as not to contact outer electrode 110 or flange 116. A three legged mounting member 122 is connected to the washer shaped member 120 by welding or the like and has an upper extension which forms around the insulative member 117 but is placed so as not to contact outer electrode 110 or flange 115. Each leg of the three legged mounting member has a foot 125 which is provided with a hole 126 for connection to the container. Near the upper end of the capacitor an insulative member 128 is placed which may be connected to the container to provide lateral support for the capacitor. Insulative member is not so connected to the outer electrode 110 as to prevent expansion and contraction but is only present to prevent the upper end of the capacitor from moving laterally. This may be accomplished by providing a loose fit between insulative member 128 and outer electrode 110 as shown. Of course if the capacitor were relatively short, no upper support would be necessary. Inner electrode 111 is fastened to outer electrode 110 by means of an insulative pin 160 which extends through both inner electrode 111 and outer electrode 110. A strap 162 is connected around outer electrode 110 to prevent pin 160 from moving. A plurality of insulative spacers 165 are placed between inner electrode 111 and outer electrode 110 throughout the length of the capacitor. Conductors 167 and 168 are provided which electrically connect the inner electrode 111 to the remainder of the system.

The inner electrode of the capacitor shown in FIGURE 1 is connected to the outer electrode by pin 160 as described. Changes in dimension caused by variations in temperature will be measured from this pin, that is, since the inner electrode 111 and the outer electrode 110 are only joined rigidly together at pin 160, contraction or expansion of the electrodes with respect to each other will be towards or away from pin 160. The length of inner electrode 111 and outer electrode 110 may be so chosen that at the lowest temperature to which the capacitor is subjected the bottom of inner electrode 111 is slightly above the bottom of outer electrode 110. This will help keep the fringing effects the same over the range of temperature.

Since the diameters of the inner and outer electrodes change by different amounts, the spacers 165 which normally space and maintain the electrodes in concentric relationship may be under some stress. As explained above, however, the actual contraction of these electrodes is so small that the slight deformation involved does not injure most standard spacers or change the accuracy of the capacitor. The spacers may be made of material having some flexibility if the stress becomes great, or they may be made of material having a coefficient of thermal expansion which is near the average coefficients for the inner and outer electrodes to minimize stress.

While the present invention has been described in terms of the preferred embodiment it will be obvious to those skilled in the art that many changes and substitutions can be made within the scope of this disclosure. For example, while only two electrodes have been shown it is clear that the teachings of this invention could be applied to a multiple or ganged electrode capacitor. While pin 160 has been shown near the lower edge of the electrodes, alternate locations are possible. Also the unit of FIGURE 2 may be inverted or mounted at an angle in certain specific applications. Furthermore, while it has been shown that the combination of stainless steel and aluminum provides greatly improved capacitance, stability, it should be realized other combinations of materials could be used to obtain adequate stability for particular use or better stability than tha shown by stainless steel and aluminum within the teachings of the present invention. I therefore do not intend to be limited by the specific disclosure used with regard to the description of the preferred embodiment but intend only to be limited by the following claims.

I claim:

1. A capacitive fluid level sensor for use over a range of temperature comprising in combination: a first closed cylindrical electrode having a diameter $D_1$ at one end of the range of temperature and a diameter $D_1'$ at the other end of the range of temperature; a second closed cylindrical electrode having a diameter $D_2$ at the one end of the range of temperature and a diameter $D_2'$ at the other end of the range of temperature; means mounting said electrodes in concentric relationship so as to form a capacitor of length L at the one end of the range of temperature and a length L' at the other end of the range of temperature, the capacitance of the capacitor being given by the equation $$C = K \frac{0.2416L}{\log \frac{D_1}{D_2}}$$

at the one end of the range of temperature and given by $$C' = K \frac{0.2416L'}{\log D_1'/D_2'}$$

at the other end of the range of temperature, said first electrode being entirely composed of a first material having a first coefficient of thermal expansion over the range of temperature and the second electrode being entirely composed of a second material having a second coefficient of thermal expansion over the range of temperature, the first and second coefficients of thermal expansion being so related that $$\frac{L}{\log D_1/D_2} - \frac{L'}{\log D_1'/D_2'}$$

is less than would be the case if the first and second coefficients of thermal expansion were equal.

2. A cylindrical capacitor comprising in combination: a first closed cylindrical electrode member having a first length, a first diameter and being comprised of a single material having a first coefficient of thermal expansion; a second closed cylindrical electrode member mounted in concentric relationship with respect to the first electrode member, and having a second length greater than the first length, a second diameter and being comprised of a single material having a second coefficient of thermal expansion greater than the first coefficient of thermal expansion, the first and second coefficients of thermal expansion being such that the rtaio of the first and second diameters changes with temperature in a way to at least partly compensate for the change in the first length with temperature.

3. A fluid level gaging capacitor for use with cold fluids comprising, in combination: an outer homogeneous electrode in the form of a closed cylinder having a first length and a first diameter; means connected to said outer electrode for mounting the outer electrode in a container of fluid; an inner homogeneous electrode having in the form of a closed cylinder a second length less than the first length and a second diameter less than the first diameter; said inner and outer electrodes being composed of materials with different coefficients of thermal expansion so that the inner and outer electrodes contract by different amounts upon insertion into the cold fluid; and means mounting said inner electrode in concentric relationship with said outer electrode comprising spacing means between said inner and outer electrodes to maintain the concentric relationship, and holding means connecting said inner and outer electrodes at one position so as to allow relative axial movement between said inner and outer electrodes.

4. A cylindrical capacitor for use over a range of temperatures comprising, in combination: a first homogeneous, closed cylindrical, electrode member and a second homogeneous, closed cylindrical, electrode member having different diameters, different lengths and comprising materials of different coefficients of thermal expansion; and means mounting said members in concentric relationship so as to allow relative axial movement therebetween, said members changing length and diameter when subjected to the range of temperature and the coefficients of thermal expansion being so chosen that the change of capacitance due to the change in lengths is at least partly compensated by the change in diameters.

References Cited by the Examiner

UNITED STATES PATENTS

| | | | |
|---|---|---|---|
| 2,100,412 | 11/37 | Scott | 317—248 |
| 2,103,457 | 12/37 | Hansell | 317—248 |
| 2,271,983 | 2/42 | LaRue | 317—247 |
| 2,448,887 | 9/48 | Huckleberry | 317—248 |
| 2,982,895 | 5/61 | Exon | 317—246 |

LARAMIE E. ASKIN, *Primary Examiner.*

SAMUEL BERNSTEIN, JOHN F. BURNS, *Examiners.*